(12) United States Patent
Park et al.

(10) Patent No.: US 8,277,089 B2
(45) Date of Patent: Oct. 2, 2012

(54) BACK LIGHT UNIT

(75) Inventors: Sung Yong Park, Seoul (KR); Kum Tae Lee, Seoul (KR); Min Sang Kim, Seoul (KR); Moon Jeong Kim, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 13/099,173

(22) Filed: May 2, 2011

(65) Prior Publication Data

US 2011/0242842 A1   Oct. 6, 2011

(30) Foreign Application Priority Data

May 4, 2010   (KR) .................. 10-2010-0041814

(51) Int. Cl.
  *F21V 7/00*   (2006.01)
(52) U.S. Cl. .............. 362/346; 362/296.01; 362/341; 362/609; 362/612; 362/623
(58) Field of Classification Search ......... 362/296.01, 362/299, 341, 346, 606, 608–609, 612, 615–616, 362/623

See application file for complete search history.

(56) References Cited

U.S. PATENT DOCUMENTS

| 2006/0221638 | A1 | 10/2006 | Chew et al. |
| 2009/0103004 | A1 | 4/2009 | Su et al. |
| 2009/0290093 | A1* | 11/2009 | Shimura et al. ............... 349/62 |
| 2009/0290097 | A1 | 11/2009 | Kim et al. |
| 2010/0085507 | A1* | 4/2010 | Cho et al. ................. 349/62 |

FOREIGN PATENT DOCUMENTS

| EP | 2 354 817 A1 | 8/2011 |
| JP | 11-288611 A | 10/1999 |
| JP | 2002-072204 A | 3/2002 |
| JP | 2004-265635 A | 9/2004 |
| JP | 2006-269365 A | 10/2006 |
| JP | 2009-129539 A | 6/2009 |
| JP | 2009-186523 A | 8/2009 |
| KR | 10-2003-0008293 A | 1/2003 |
| KR | 10-2006-0106774 A | 10/2006 |
| KR | 10-2009-0121926 A | 11/2009 |
| WO | WO 2009/019964 A1 | 2/2009 |
| WO | WO 2009/145548 A2 | 12/2009 |
| WO | WO 2010/038516 A1 | 4/2010 |
| WO | WO 2010/038808 A1 | 4/2010 |

* cited by examiner

*Primary Examiner* — Stephen F Husar
*Assistant Examiner* — Meghan Dunwiddie
(74) *Attorney, Agent, or Firm* — Birch, Stewart, Kolasch & Birch, LLP

(57) ABSTRACT

A back light unit including a light emitting device assembly is disclosed. The light emitting device assembly includes a light emitting device module having a light emitting device, a light guide plate having a light incidence part disposed adjacent to the light emitting device module so that light generated from the light emitting device is incident upon the light incidence part and a light emission part from which the incident light is emitted, a reflective sheet provided at one side of the light guide plate, and a light adjustment part extending from the reflective sheet for adjusting a reflection amount of the light emitted from the light guide plate.

20 Claims, 14 Drawing Sheets

BACK LIGHT UNIT

Pursuant to 35 U.S.C. §119(a), this application claims the benefit of Korean Patent Application No. 10-2010-0041814, filed on May, 4, 2010, which is hereby incorporated by reference as if fully set forth herein.

BACKGROUND

The embodiments relate to a back light unit, and more particularly, to a back light unit having a plurality of light emitting device assemblies.

A liquid crystal display, which is a kind of passive flat panel display, used in computer monitors, liquid crystal display (LCD) televisions, mobile communication terminals, etc., does not emit light itself. For this reason, the liquid crystal display selectively projects illumination light irradiated from the outside to form an image.

To this end, a back light unit to irradiate light is mounted at the inner rear of the liquid crystal display.

Based on the disposition of light emitting devices, a back light unit is classified as a direct light type back light unit or an edge light type back light unit.

In the direct light type back light unit, light emitting devices are disposed at a light guide plate provided at the rear of a liquid crystal panel to irradiate light toward the rear of the light guide plate. In the edge light type back light unit, light emitting devices are disposed at the side of a light guide plate to irradiate light toward the side of the light guide plate.

In a conventional back light unit, a single light emitting device array or a plurality of light emitting device arrays are covered by a single light guide plate. If a portion of the light guide plate is defected, therefore, it is necessary to replace the entirety of the light guide plate with a new one.

In particular, if a portion of the surface of the light guide plate is scratched, stained or deformed, the brightness or darkness of light on a portion of a screen of a display corresponding to the scratched, stained or deformed portion of the surface of the light guide plate is considerably different from the brightness or darkness of light at the remaining portions of the screen of the display. In order to solve such a problem, therefore, it is necessary to replace the entirety of the light guide plate with a new one.

Meanwhile, for a display having a large-sized screen, the size of a light guide plate is increased in proportion to the size of the screen. In manufacturing a back light unit using such a large-sized light guide plate, assembly is troublesome and too much time is needed.

SUMMARY

Accordingly, the embodiments are directed to a back light unit that substantially obviates one or more problems due to limitations and disadvantages of the related art.

The embodiments are to provide a back light unit having a plurality of light emitting device assemblies, thereby more easily achieving assembly and management of the light emitting device assemblies.

The embodiments are to provide a back light unit that uniformly distributes light on a screen.

Additional advantages and features of the embodiments will be set forth in part in the description which follows and in part will become apparent to those having ordinary skill in the art upon examination of the following or may be learned from practice of the embodiments. The other advantages of the embodiments may be realized and attained by the structure particularly pointed out in the written description and claims hereof as well as the appended drawings.

To achieve other advantages and in accordance with the purpose of the embodiments, as embodied and broadly described herein, a back light unit includes a light emitting device assembly including a light emitting device module having a light emitting device, a light guide plate having a light incidence part disposed adjacent to the light emitting device module so that light generated from the light emitting device is incident upon the light incidence part and a light emission part from which the incident light is emitted, a reflective sheet provided at one side of the light guide plate, and a light adjustment part extending from the reflective sheet for adjusting a reflection amount of the light emitted from the light guide plate.

The light adjustment part may be integrally formed with the reflective sheet.

The light adjustment part may extend from each side of the reflective sheet by a predetermined length.

The light emitting device assembly may include at least two light emitting device assemblies disposed adjacent to each other, and the light emitting device assemblies may be disposed so that a light adjustment part of a light emitting device assembly at least partially overlaps or contacts a light adjustment part of another light emitting device assembly.

A light adjustment part of each light emitting device assembly disposed at a region adjacent to the light emitting device module may be disposed spaced apart from a light adjustment part of another light emitting device assembly, and a light adjustment part of each light emitting device assembly spaced apart from the light emitting device module by a predetermined length may overlap or contact a light adjustment part of another light guide plate.

The light adjustment part may include a first light adjustment part provided at each side of the reflective sheet, the first light adjustment part having a predetermined reflection area, and a second light adjustment part connected to the first light adjustment part, the second light adjustment part having a larger reflection area than the first light adjustment part, and the first light adjustment part may extend from each side of the reflective sheet and the second light adjustment part may extend longer than the first light adjustment part.

The first light adjustment part and the second light adjustment part may form a step.

The light emitting device assembly may include a plurality of light emitting device assemblies, a first light emitting device assembly may have a first light adjustment part provided at a lower part of each side of a light guide plate thereof and a second light adjustment part provided at an upper part of each side of a light guide plate thereof, and a second light emitting device assembly disposed adjacent to the first light emitting device assembly may have a first light adjustment part provided at an upper part of each side of a light guide plate thereof and a second light adjustment part provided at a lower part of each side of a light guide plate thereof.

The back light unit may further include a bottom cover for accommodating the light emitting device assemblies, the first light emitting device assembly may be disposed at a middle of the bottom cover, the second light emitting device assembly may be disposed at each side of the first light emitting device assembly, and the first and second light emitting device assemblies disposed in a horizontal direction may be arranged so as to form a plurality of rows in a vertical direction of the bottom cover.

The second light adjustment part of the first light emitting device assembly may have a longer extension length than the second light adjustment part of the second light emitting device assembly.

The second light adjustment part of the first light emitting device assembly may overlap or contact the first light adjustment part of the second light emitting device assembly, and the first light adjustment part of the first light emitting device assembly may be spaced apart from the second light adjustment part of the second light emitting device assembly.

The light adjustment part may further include a third light adjustment part extending longer than the second light adjustment part thus having a larger reflection area than the second light adjustment part, the first light adjustment part may be provided at a middle of each side of the reflective sheet, the second light adjustment part may be provided below the first light adjustment part, and the third light adjustment part may be provided above the first light adjustment part.

The reflective sheet may have a larger horizontal width than the light guide plate so that the light adjustment part reflects light emitted from each side of the light guide plate.

In another aspect of the embodiments, a back light unit includes a light emitting device module having a light emitting device, a light guide plate having a light incidence part disposed adjacent to the light emitting device module so that light generated from the light emitting device is incident upon the light incidence part and a light emission part from which the incident light is emitted, a reflective sheet provided at one side of the light guide plate, and a print pattern provided at the reflective sheet for adjusting a reflection amount of the light emitted from the light guide plate.

The print pattern may have a color, such as black, blue or indigo.

The print pattern may be formed at each side of a front surface of the reflective sheet.

The print pattern may be formed in a vertical length direction of the reflective sheet.

The print pattern may have a maximum width at the middle thereof and the width of the print pattern may be reduced gradually from the middle to opposite ends thereof.

The print pattern may have a lower end adjacent to the light emitting device module, and the width of the lower end of the print pattern may be thicker than the width of an upper end of the print pattern.

The reflective sheet may have a larger horizontal width than the light guide plate, and the print pattern may be disposed so that at least a portion of the print pattern is not covered by the light guide plate when the light guide plate overlaps the reflective sheet.

It is to be understood that both the foregoing general description and the following detailed description of the embodiments are exemplary and explanatory and are intended to provide further explanation of the embodiments as claimed.

BRIEF DESCRIPTION OF THE DRAWINGS

The accompanying drawings, which are included to provide a further understanding of the embodiments and are incorporated in and constitute a part of this application, illustrate embodiments and together with the description serve to explain the principle of the embodiments. In the drawings.

DETAILED DESCRIPTION OF THE EMBODIMENTS

Figure 1:
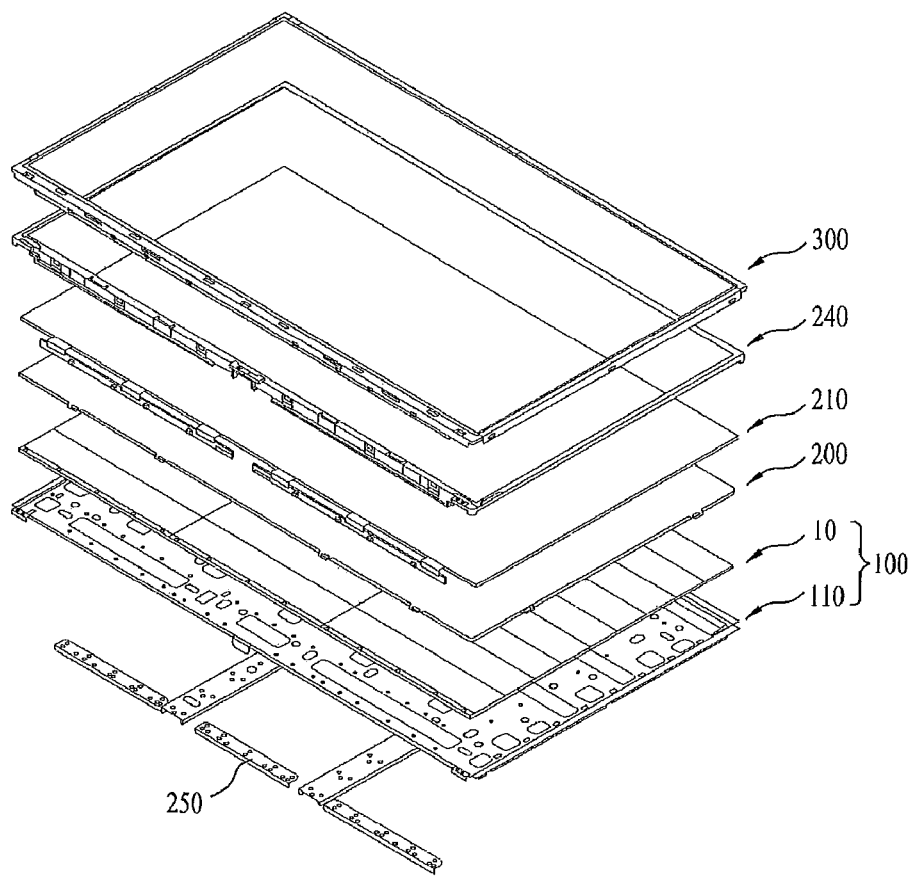
FIG. 1 is an exploded perspective view illustrating a display device having a back light unit according to an embodiment.

Reference will now be made in detail to the preferred embodiments, examples of which are illustrated in the accompanying drawings.

In a description of embodiments, it will be understood that, when an element, such as a layer (film), a region, a pattern or a structure is referred to as being "on" or "under" another element, such as a substrate, a layer (film), a region, a pad or a pattern, it can be directly on the other element or intervening elements may also be present. Further, "on" or "under" the element may be described relative to the drawings.

In the drawings, the thicknesses or sizes of respective layers are exaggerated, omitted, or schematically illustrated for convenience and clarity of description. Further, the sizes of the respective elements do not denote the actual sizes thereof. Wherever possible, the same reference numbers will be used throughout the drawings to refer to the same or like parts.

As shown in FIG. 1, a display device according to an embodiment includes a back light unit 100, an optical sheet unit 200 disposed at the front of the back light unit 100 for diffusing light emitted from the back light unit 100, and a display panel 210 disposed at the front of the optical sheet unit 200 for displaying an image.

A support member 240 is provided at the edges of the back light unit 100, the optical sheet unit 200 and the display panel 210 so as to support and fix the back light unit 100, the optical sheet unit 200 and the display panel 210. A top cover 300 is mounted to the support member 240.

The back light unit 100 includes a bottom cover 110 and a plurality of light emitting device assemblies 10 mounted in the bottom cover 110. The light emitting device assemblies 10 are disposed on the inner surface of the bottom cover 110 so as to be adjacent to each other.

At least one beam member 250 is provided at the rear of the bottom cover 110 in the vertical direction or the horizontal direction. The beam member 250 prevents thermal deformation or physical deformation of the bottom cover 110.

The beam member 250 may extend in one direction and may be made of a metal material having a lower thermal expansion coefficient and higher stiffness than the bottom cover 110.

Meanwhile, a power supply device (not shown) to supply power to the backlight unit 100 and the display panel 210 and a substrate (not shown) at which other drive circuits are mounted may be provided at the rear surface of the bottom cover 110.

Figure 2:
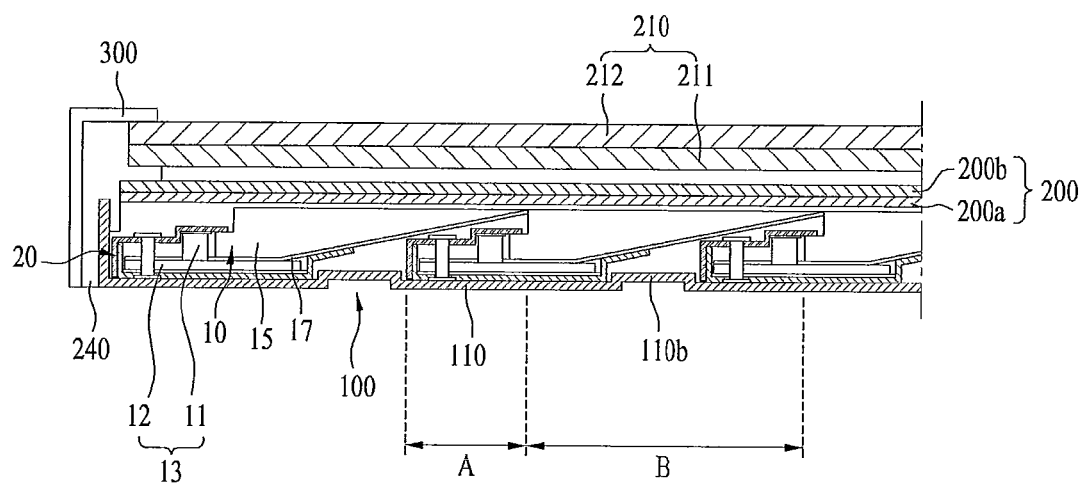
FIG. 2 is a side sectional view illustrating a display device according to an embodiment.

As shown in FIG. 2, the light emitting device assemblies 10 are disposed at the top of the bottom cover 110 constituting the back light unit 100 so that the light emitting device assemblies 10 are adjacent to each other.

Each of the light emitting device assemblies 10 includes a light emitting device module 13, a light guide plate 15 disposed adjacent to the light emitting device module 13, a reflection sheet 17 disposed at the rear of the light guide plate 15, and a fixing cover 20 for simultaneously fixing the light emitting device module 13, the light guide plate 15 and the reflection sheet 17.

The light emitting device module 13 includes a light emitting device 11 and a circuit board 12 on which the light emitting device 11 is disposed. The light emitting device 11 is disposed to emit light toward the light guide plate 15.

A portion at which the light emitting device module 13 is disposed may be defined as a light generation region A, and a portion upon which light generated from the light emitting device module 13 is incident and emitted from the light guide plate 15 may be defined as a light emission region B.

The light emitting device assemblies 10 are disposed along the inner surfaces of the bottom cover 100 so that the light emitting device assemblies 10 are adjacent to each other in a state in which a portion of one of the light emitting device assemblies 10 is provided to cover a portion of a neighboring light emitting device assembly 10.

This structure is possible since the lower part of the light guide plate 15 is inclined. A portion of a light emission region B of a light emitting device assembly 10 covers a light generation region A of another light emitting device assembly 10.

The bottom cover 100 is provided with a heat dissipation protrusion 110b protruding inward. The heat dissipation protrusion 110b increases surface area of the bottom cover 110, thereby improving heat dissipation efficiency.

Also, the heat dissipation protrusion 110b is disposed between neighboring light emitting device assemblies 10 to support the light emitting device assemblies 10.

Specifically, the lower part of the light guide plate 15 is inclined with the result that a space is defined between the light guide plate 15 and the bottom cover 100 and between the reflection sheet 17 and the bottom cover 100. The heat dissipation protrusion 110b may be disposed in the space.

The heat dissipation protrusion 110b may serve as a kind of spacer for guiding installation positions of the light emitting device assemblies 10. In a case in which the display device or the back light unit is disposed upright, the heat dissipation protrusion 110b may serve as a support unit for supporting the lower part of a corresponding one of the light emitting device assemblies 10.

The optical sheet unit 200, which is disposed at the top or the front of the light guide plate 15, may include a diffusion sheet 200a and/or a prism sheet 200b.

The diffusion sheet 200a serves to uniformly diffuse light emitted from the light guide plate 15, and light diffused by the diffusion sheet 200a may be condensed on the display panel 210 by the prism sheet 200b.

The prism sheet 200b may include a horizontal or vertical prism sheet. At least one sheet of luminous intensity reinforcement film may be used to constitute the prism sheet 200b.

Although not shown, a guide pin (not shown) for supporting the optical sheet unit 200 may be provided in the bottom cover 100 so that the optical sheet unit 200 is not shaken but is kept fixed when the optical sheet unit 200 is disposed at the back light unit 100.

A predetermined hole or groove, into which the guide pin (not shown) is coupled, may be formed at the optical sheet unit 200. The guide pin (not shown) is coupled into the hole or the groove so that the optical sheet unit 200 is fixed to the bottom cover 100.

The display panel 210 is provided at the front or the top of the optical sheet unit 200.

The display panel 210 includes a lower board 211 and an upper board 212 coupled to each other while being opposite to each other so that a uniform cell gap is defined therebetween. A liquid crystal layer may also be provided between the lower board 211 and the upper board 212.

A plurality of gate lines and a plurality of data lines intersecting the gate lines are formed at the lower board 211. Thin film transistor (TFTs) may be formed at intersections between the gate lines and the data lines.

Meanwhile, RGB color filters may be provided at the upper board 212. However, the color filters are not provided only at the upper board 212.

The lower board 211 may include color filters in addition to the TFTs.

The display panel 210, including the lower board 211 and the upper board 212, is not limited to the above-described structure. Based on how the liquid crystal layer is driven, the display panel 210 may be configured in various structures.

The display panel 210 may be provided at the edge thereof with a gate driving printed circuit board (PCB) for supplying scan signals to the gate lines. Also, a polarizing film (not shown) may be disposed at the top (front) or the bottom (rear) of the display panel 210.

The edges of the display panel 210, the optical sheet unit 200 and the back light unit 100 are surrounded and fixed by the support member 240, and the support member 240 is surrounded and fixed by the top cover 300.

Figure 3:
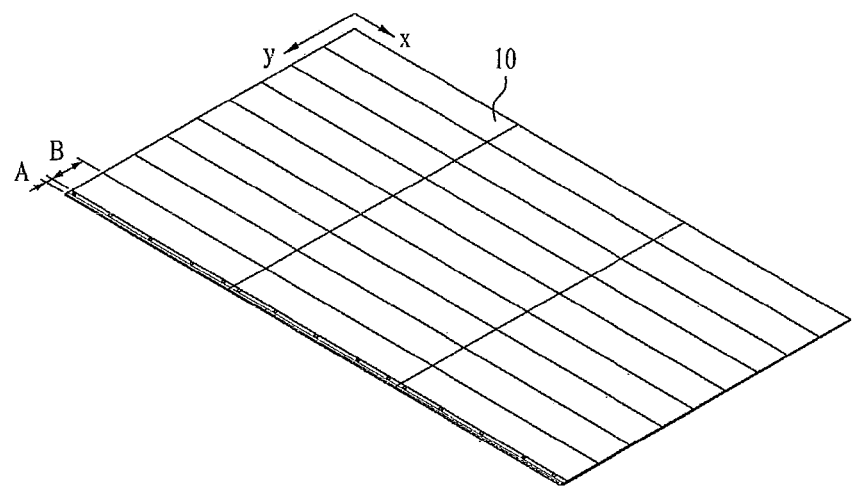
FIG. 3 is a perspective view illustrating the arrangement of a plurality of light emitting device assemblies of the back light unit.

As shown in FIG. 3, the light emitting device assemblies 10 may be arranged in a matrix having a plurality of columns in the direction of the x-axis and a plurality of rows in the direction of the y-axis. For example, 27 light emitting device assemblies 10 may be arranged in a 3×9 matrix.

Each of the light emitting device assemblies 10 includes a light generation region A generating light and a light emission region B emitting light. Except for the lowermost light emitting device assembly 10, the light generation regions A of the light emitting device assemblies 10 may be covered by the light emission regions B of the lower light emitting device assemblies 10.

Through such a structure, the light generation regions A of the light emitting device assemblies 10 except for the lowermost light emitting device assembly 10 are not exposed to the outside.

Figure 4:
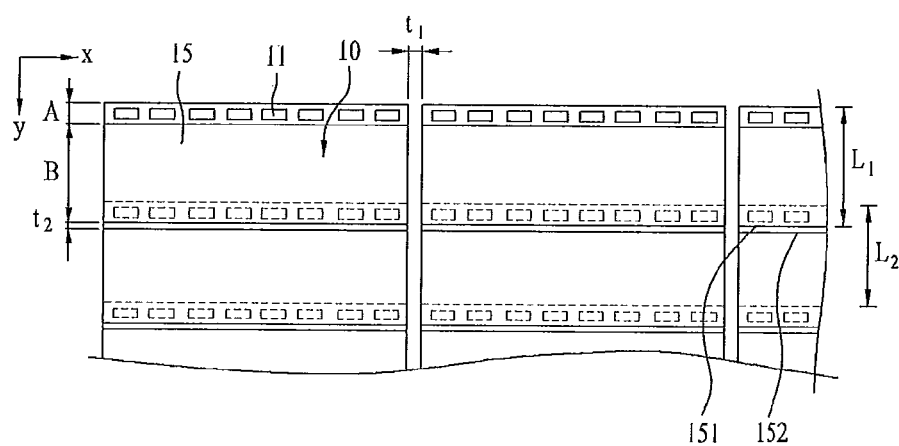
FIG. 4 is a plan view illustrating the arrangement of the light emitting device assemblies of FIG. 3.

As shown in FIG. 4, if the light emitting device assemblies 10 are disposed so as to partially overlap each other, the light guide plates 15 of the respective light emitting device assemblies 10 may be separated from each other by predetermined distances in the vertical and the horizontal directions.

Here, the x direction indicates the horizontal direction in which the light emitting device assemblies 10 are separated from each other by a predetermined distance $t_1$ without overlapping, and the y direction indicates the vertical direction in which the light emitting device assemblies 10 are overlapped to some extent.

A vertical region of a specific light emitting device assembly 10 is defined as $L_1$, and a vertical region of another light emitting device assembly 10 partially overlapping the former light emitting device assembly 10 is defined as $L_2$.

A light emitting device assembly 10 having a region $L_1$ and another light emitting device assembly 10 having a region $L_2$ partially overlap each other so that a part where the light emitting device 11 is not exposed to the outside, thereby preventing brightness from being excessively increased at the part.

The light guide plates 15 are disposed adjacent to each other so that the light guide plates 15 form a plat surface, and therefore uniform brightness is maintained over a screen.

An end 151 of the light guide plate 15 of the light emitting device assembly 10 having the vertical region $L_1$ is separated from a step 152 of the light guide plate 15 of the light emitting device assembly 10 having the vertical region $L_2$ by a predetermined distance $t_2$.

The distances $t_1$ and $t_2$ are set in the above-described manner in consideration of the fact that the light guide plates 15 are made of a resin, and therefore, the light guide plates 15 may thermally expand due to heat generated from the light emitting device module.

The above-defined distances prevent the light guide plates 15 from being deformed or damaged by contact between the neighboring light guide plates.

Particularly, if the light emitting devices include light emitting diodes (LEDs) and the light guide plates 15 are made of a resin having a high thermal expansion coefficient, the light guide plates 15 may thermally expand due to heat generated from the LEDs.

In view of these characteristics, if the light guide plates 15 are disposed so as to contact each other prior to thermal expansion, the light guide plates 15 mutually apply pressure to each other during thermal expansion with the result that the light guide plates 15 may be damaged or thermally deformed.

Also, the light emitting device assemblies 10 including the light guide plates 15 may be dislocated.

However, the respective light guide plates 15 do not contact the adjacent light guide plates 15 but are separated from the adjacent light guide plates 15 at predetermined intervals, as described above, thereby solving problems, such as deformation and dislocation, due to thermal expansion.

Since the light emitting devices 11 are disposed at the lower parts of the light guide plates 15 of the light emitting device assemblies 10 of this embodiment, as previously described with reference to FIG. 2, the light emitting device assemblies 10 constitute an edge light type back light unit.

On the other hand, since the respective light emitting device assemblies 10 are disposed so as to be adjacent to each other and each of the light emitting device assemblies 10 serves as one light emitting device, the light emitting device assemblies 10 also exhibit characteristics of a direct light type back light unit.

In this case, however, as compared with a general direct light type light emitting device exhibiting characteristics of a point light emitting device, the light emitting device assemblies 10 of this embodiment may exhibit characteristics of a surface light emitting device.

Therefore, the light emitting device assemblies 10 solve a problem in that the light emitting devices form hot spots on a screen and are thinner than a conventional direct light type light emitting device.

Figure 5:
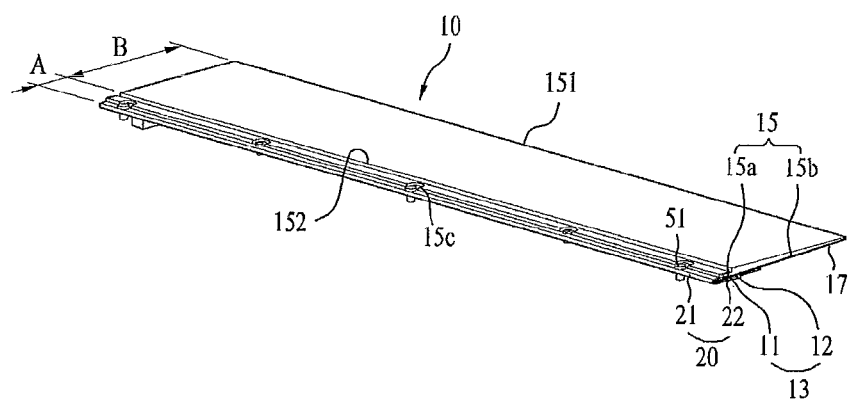
FIGS. 5 and 6 are front perspective views illustrating a light emitting device assembly according to an embodiment.

As shown in FIG. 5, each light emitting device assembly 10 is divided into the light generation region A and the light emission region B.

The light generation region A includes a light emitting device module 13, including a light emitting device 11 and a circuit board 12, and a light incidence part 15a constituting a portion of the light guide plate 15 and disposed adjacent to the light emitting device 11 so that light from the light emitting device 11 is incident upon the light incidence part 15a.

The light emitting device module 13 and the light incidence part 15a of the light guide plate 15 are surrounded and coupled by a fixing cover 20.

The fixing cover 20 serves to cover front and rear parts of the light generation region A. The front part of the light generation region A is surrounded by a first fixing cover 21 and the rear part of the light generation region A is surrounded by a second fixing cover 21.

The light emission region B includes a light emission part 15b constituting a portion of the light guide plate 15 and a reflective sheet 17 disposed at the rear of the light emission part 15b.

The light emission part 15b is connected to the light incidence part 15a and extends in one direction.

The step 152 is provided at the interface between the light emission part 15b and the light incidence part 15a. An end 151 is provided at the tip of the light emission part 15b, and the thickness of the end 151 is the thinnest among other parts of the light guide plate 15.

Figure 6:
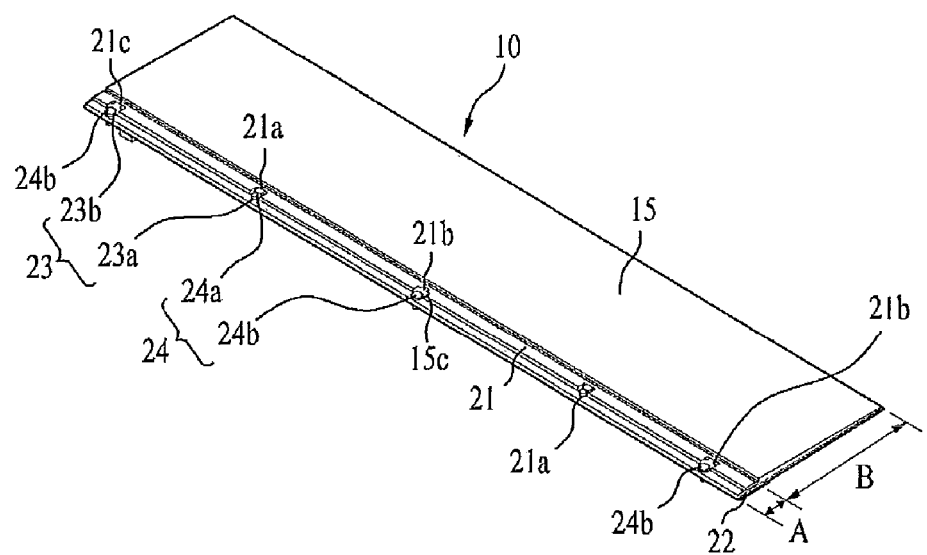

As shown in FIG. 6, fixing holes 21a, 21b and 21c into which portions of the light guide plate 15 are fixedly inserted are provided at the first fixing cover 21.

Since the portions of the light guide plate 15 are coupled into the fixing holes 21a, 21b and 21c, positioning between the light guide plate 15 and the first fixing cover 21 may be possible.

Meanwhile, predetermined insertion holes 23; 23a and 23b are provided beside the fixing holes 21a, 21b and 21c, and screw-shaped coupling members 24; 24a and 24b are inserted into the insertion holes 23a and 23b.

Among the insertion holes 23; 23a and 23b provided at the first fixing cover 21, the insertion holes 23b located at the middle and opposite ends of the first fixing cover 21 are provided so as to fix the light emitting device assembly 10 to the bottom cover 110 (see FIG. 1) using the coupling members 24b.

The small insertion holes 23a located at opposite sides of the insertion hole 23b located at the middle of the first fixing cover 21 are provided so as to connect the light guide plate 15 and the light emitting device module 13 using the coupling members 24a.

Figure 7:
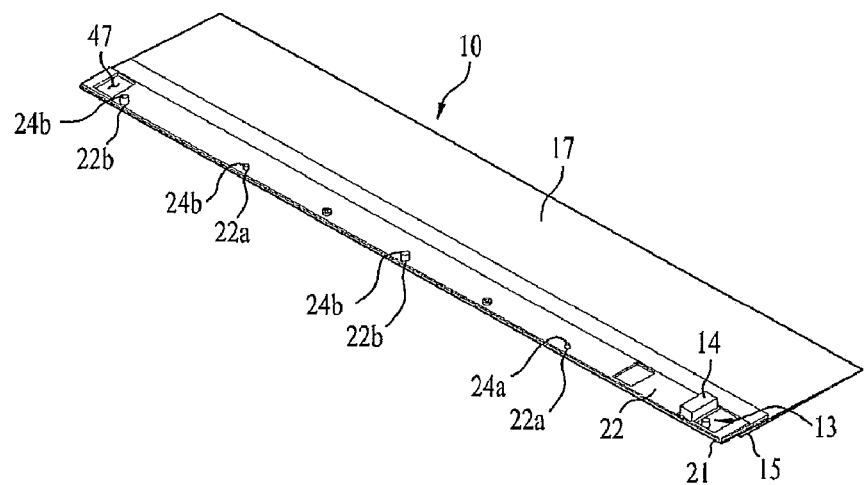
FIG. 7 is a rear perspective view of the light emitting device assembly according to the embodiments.

As shown in FIG. 7 which illustrates the rear surface of the light emitting device assembly 10, the rear surface of the light guide plate 15 is covered with the reflective sheet 17 and the second fixing cover 22 is provided under the reflective sheet 17 so as to cover the reflective sheet 17 and the light guide plate 15 while fixing the reflective sheet 17 and the light guide plate 15.

Coupling holes 22a and 22b corresponding to the insertion holes 23a and 23b, formed at the first fixing cover 21, are formed at the second fixing cover 22.

The coupling members 24; 24a and 24b are inserted through the insertion holes 23a and 23b and the coupling holes 22a and 22b, and ends of the relatively large coupling members 24b protrude so that the protruding ends of the coupling members 24b are coupled to the bottom cover 110 (see FIG. 1).

Also, a connector hole 47 is provided at the second fixing cover 22. A connector 14 connected to the light emitting device module 13 is inserted into the connector hole 47 and coupled to the bottom cover 110 (see FIG. 1).

A plurality of connector holes 47 may be provided at the second fixing cover 22 because the position of the connector 14 may be varied according to the position at which the light emitting device assembly 10 is coupled to the bottom cover 110.

The connector 14 is connected to a power supply device (not shown) provided at the bottom cover 110, and power is supplied to the light emitting device module 13 through such connection.

Figure 8:
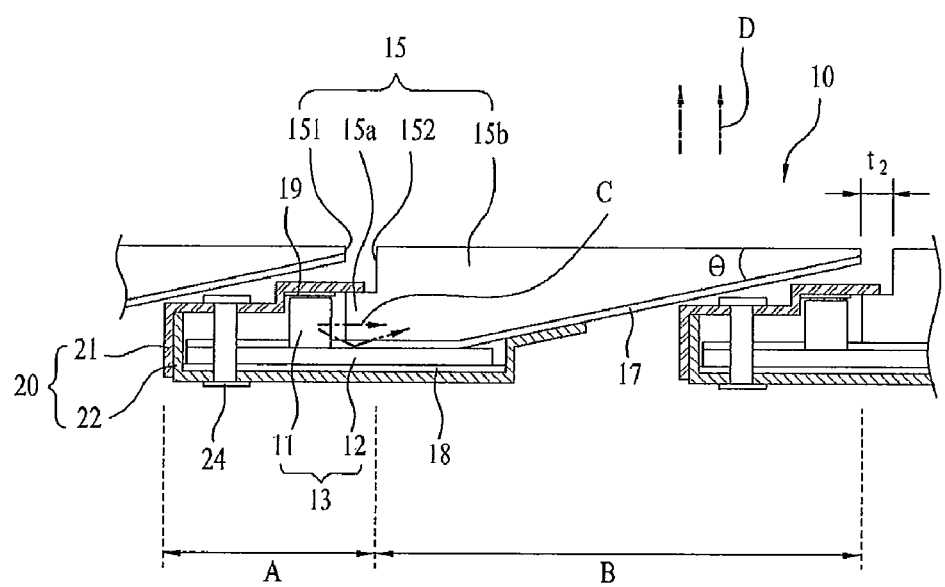
FIG. 8 is a side sectional view of the light emitting device assembly according to the embodiments.

As shown in FIG. 8, the light emitting device assembly 10 is divided into the light generation region A and the light emission region B, as previously described, and the light generation unit A generally includes the light emitting device module 13 including the LED type light emitting device 11 and the circuit board 12.

The side surface of the light incidence part 15a of the light guide plate 15 faces the light emitting device 11. When the light emitting device 11 generates light, the light moves in the direction C and is incident upon the light incidence part 15a.

The light emission part 15b is connected integrally to the light incidence part 15a. Light entering through the light incidence part 15a is subjected to total reflection and diffused reflection in the light guide plate 15 and is then emitted to the outside of the light emission part 15b.

Light is emitted throughout the light emission part 15a. However, light directed to the rear (or the bottom) of the light guide plate 15 is reflected by the reflective sheet 17 provided at the rear (or the bottom) of the light guide plate 15, is incident back upon the light guide plate 15, and is mostly emitted in the direction D.

The reflective sheet 17 is disposed over the rear (or the bottom) of the light guide plate 15, and a portion of the reflective sheet 17 is fixedly fitted between the circuit board 12 constituting the light emitting device module 13 and the light guide plate 15.

Connection between the light emitting device module 13, the light guide plate 15 and the reflective sheet 17 is maintained by the fixing cover 20. The first fixing cover 21 having the step is disposed at the front (or the top) of the light emitting device assembly 10 and the second fixing cover 22 is disposed at the rear (or the bottom) of the light emitting device assembly 10.

The first and second fixing covers 21 and 22 are coupled to the circuit board 12 by the coupling members 24.

The first fixing cover 21 is provided at the inner surface thereof with an auxiliary reflective sheet 19 for guiding a portion of light generated from the light emitting device 11 toward the light incidence part 15a of the light guide plate 15.

Most of the light generated from the light emitting device is directed to the light incidence part 15a; however, a portion of the light is diffused and directed to the first fixing cover 21.

The auxiliary reflective sheet 19 serves to guide the diffused light to the light guide plate 15.

In addition to light reflection, the auxiliary reflective sheet 19 also serves to prevent electric conduction due to contact between an electrode of the light emitting device 13 and the first fixing cover 21.

To this end, the size of the auxiliary reflective sheet 19 may be equal to or slightly larger than the size of the light emitting device 13.

The second fixing cover 22 is disposed adjacent to the circuit board 12. A heat dissipation member 18 to transmit heat generated from the circuit board 12 to the second fixing cover 22 is provided between the circuit board 12 and the second fixing cover 22.

If heat generated from the light emitting device module 13 remains on the circuit board 12, the heat causes abnormality in generation of light from the light emitting device 11. Therefore, the heat dissipation member 18 is provided to rapidly discharge the generated heat to the outside.

The heat dissipation member 18 may be made of a material, such as metal or graphite, exhibiting high thermal conductivity.

The size of the heat dissipation member 18 may be equal to or slightly larger than the horizontal and vertical widths of the circuit board 12.

The light emission part 15b of the light guide plate 15 is configured so that the bottom of the light emission part 15b has a predetermined inclination angle θ and the thickness of the light emission part 15b gradually decreases toward the end 151.

The end 151 of the light guide plate 15 of the light emitting device assembly 10 is disposed so as to cover the light generation region A of the adjacent light emitting device assembly 10. Here, the inclination angle may vary according to circumstances. However, the inclination angle θ of the light emission part 15b may be optimized so that light incident upon the light incidence part 15a is diffused and reflected by the bottom of the light emission part 15b and is thus maximally efficiently emitted from the top of the light emission part 15b.

Also, a scattering pattern or a prism pattern may be formed at the surface of the light guide plate 15 so as to improve light emission efficiency.

The end of the reflective sheet 17 disposed along the inclined plane formed on the bottom of the light guide plate 15 may be provided so as to end at the step 152 of the light guide plate 15, or may be provided so as to exceed the step 152 and contact an adjacent light guide plate 15, as shown in FIG. 8.

The light guide plates 15 are disposed such that a light guide plate 15 is separated from an adjacent light guide plate 15 by a predetermined distance in consideration of thermal expansion. The reflective sheet 17 covers the distance between the neighboring light guide plates 15 so that light emitted from the light guide plate 15 is reflected to the front (or the top) of the light guide plate 15. To this end, the end of the reflective sheet 17 may be disposed over the step 152 of the light guide plate 15.

Therefore, generation of dimming lines on a screen may be prevented and optical loss may be minimized.

In this way, the top (or the front) of the light guide plate 15 forms a flat surface together with the top (or the front) of the adjacent light guide plate 15 through the arrangement of the light emitting device assemblies 10, thereby achieving an efficient function as a surface light emitting device.

Figure 9:
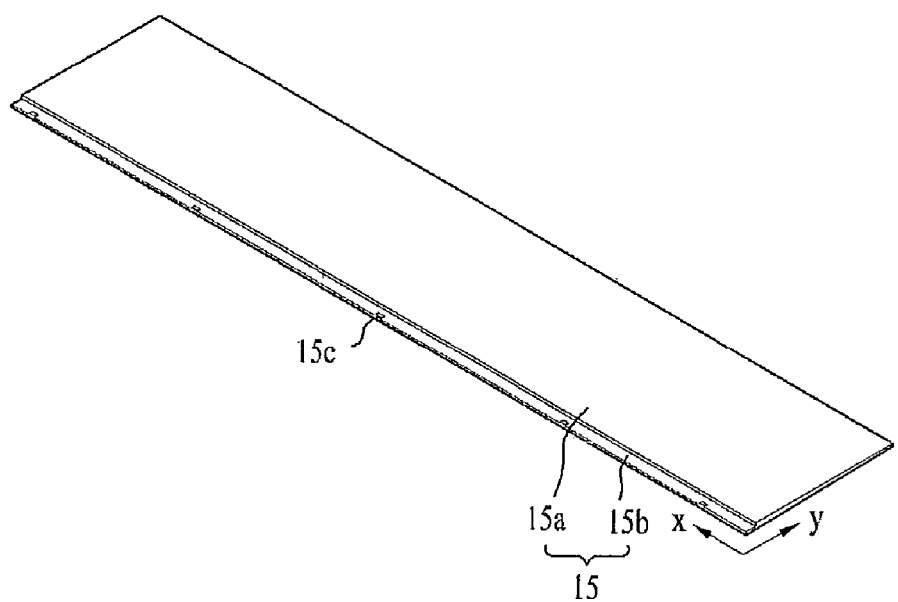
FIG. 9 is a perspective view illustrating a light guide plate according to an embodiment.

As shown in FIG. 9, the light guide plate 15 is provided at the lower part thereof with protrusions 15c. Specifically, the protrusions 15c are formed at the surface of the light incidence part 15a.

The protrusions 15c are inserted into the fixing holes 21a, 21b and 21c (see FIG. 6) formed at the first fixing cover 21 (see FIG. 6) so that the light guide plate 15 is fixed to the first fixing cover 21 without shaking.

The protrusions 15c may be formed in various shapes (a circle, a square pillar, etc.). The protrusions 15c may be arranged along the side of the light incidence part 15a at predetermined intervals.

Figure 10:
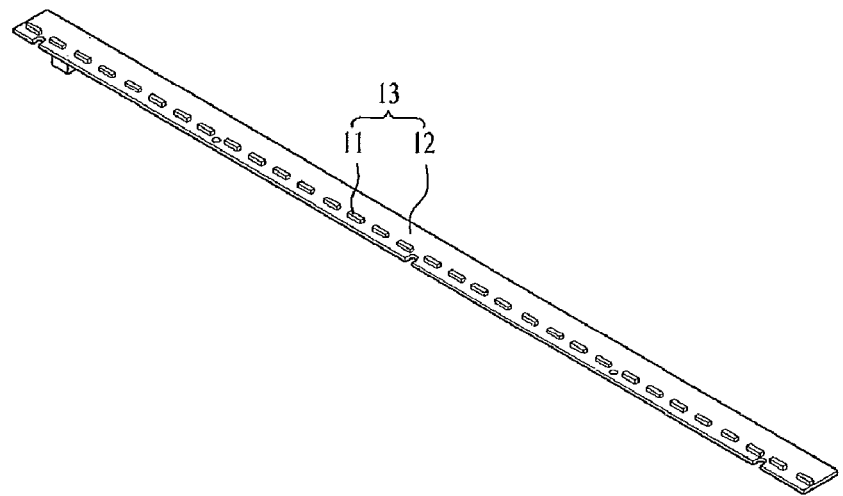
FIG. 10 is a front perspective view illustrating a light emitting device module according to an embodiment.

FIG. 10 illustrates a light emitting device module 13. The light emitting device module 13 includes a circuit board 12 extending in the horizontal direction and a plurality of light emitting devices 11 arranged at the surface of the circuit board 12 at predetermined intervals.

The circuit board 12 may be a general printed circuit board (PCB), a metal core PCB, or a flexible PCB, to which, however, the circuit board 12 is not limited.

Each of the light emitting devices may be formed of an LED, as previously described. In particular, three or four light emitting devices form a single unit, which is driven independently of other units upon the supply of power.

As a result, an operation, such as local dimming, is performed, thereby achieving more efficient brightness during operation of the display device.

In this embodiment, the number of LEDs is 32, and four LEDs form a single unit. Consequently, 8 units constitute a single light emitting device module 13. However, the number of LEDs is not limited to 32, and various numbers of LEDs may be used.

Figure 11:
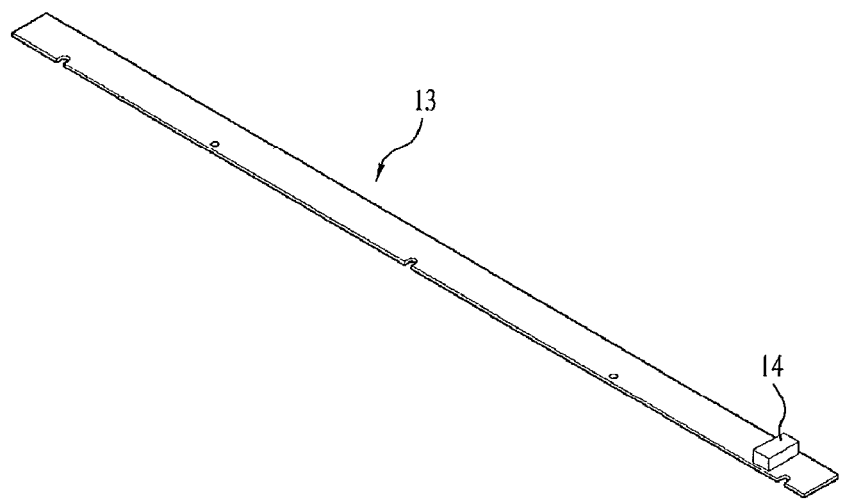
FIG. 11 is a rear perspective view of the light emitting device module according to the embodiments.

As shown in FIG. 11, the connector 14 is provided at the rear of the light emitting device module 13 so that the light emitting device module 13 is connected to the power supply device provided at the bottom cover 110 (see FIG. 1).

Figure 12:
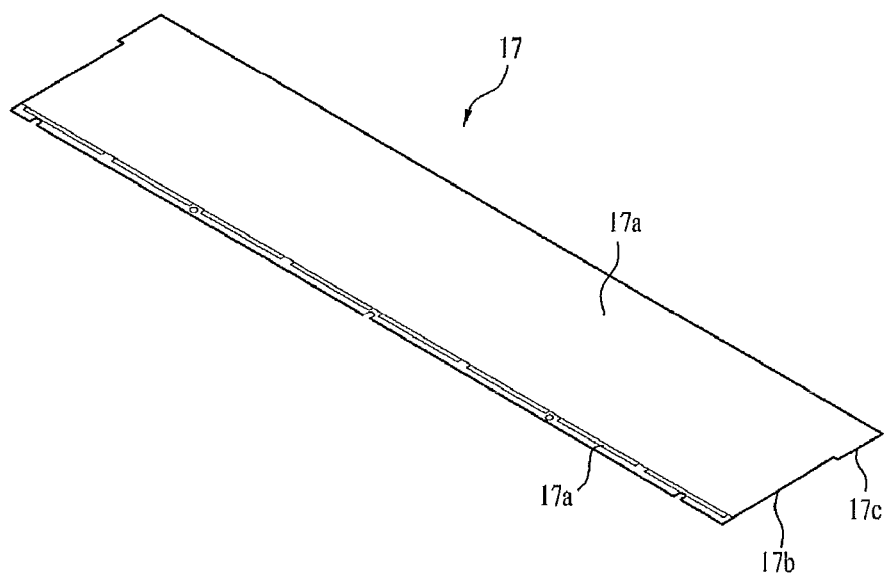
FIG. 12 is a perspective view illustrating a reflection sheet according to an embodiment.

As shown in FIG. 12, the reflective sheet 17 includes a reflective surface 17a, light adjustment part 17b and 17c extending from opposite sides of the reflective surface 17a in the horizontal direction for adjusting a reflection amount of light, and insertion holes 17d provided at the lower part of the reflective surface 17a so that the light emitting devices 11 (see FIG. 10) are inserted into the insertion holes 17d. Here, the light adjustment part 17b and 17c may be formed integrally at the reflective sheet 17.

Each of the insertion holes 17d is formed in the shape of a slot extending in the horizontal direction.

As previously described, several light emitting devices 11 form a single unit, and a plurality of units constitute a single light emitting device module 13 (see FIG. 10). The number of the insertion holes 17d corresponds to the number of the units so that one unit is inserted into one insertion hole 17d.

The insertion holes 17d are arranged at intervals in the horizontal direction.

Figure 13:
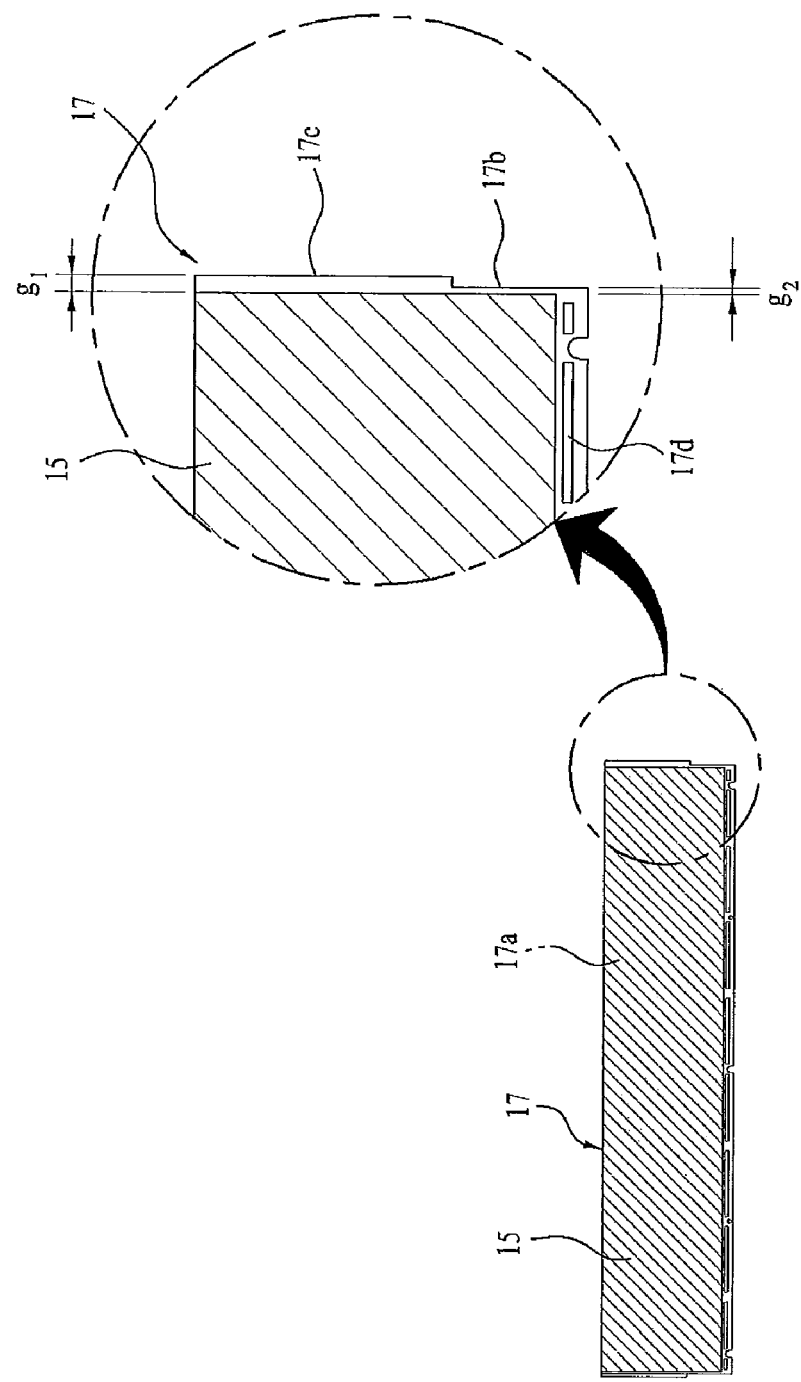
FIG. 13 is a front view illustrating a first reflection sheet according to an embodiment.

As shown in FIG. 13, the reflective sheet 17 is provided so as to overlap the light guide plate 15. The horizontal width of the reflective sheet 17 may be larger than the horizontal width of the light guide plate 15.

Light emitted from the light guide plate 15 may reach the side of the light guide plate 15. The light reaching the side of the light guide plates is reflected to the front by the reflective sheet 17.

The light adjustment part 17b and 17c extending from the opposite sides of the reflective surface 17a of the reflective sheet 17 in the horizontal direction includes a first light adjustment part 17b and a second light adjustment part 17c.

The first light adjustment part 17b has an extension length $g_2$, which is different from an extension length $g_1$ of the second light adjustment part 17c. Here, the respective extension lengths are set on the basis of the side of the light guide plate 15.

Here, the first light adjustment part 17b and the second light adjustment part 17c have different extension lengths, and therefore, the first light adjustment part 17b and the second light adjustment part 17c form a step.

The extension length $g_1$ of the second light adjustment part 17c is longer than the extension length $g_2$ of the first light adjustment part 17b.

As a result, a reflection area of the second light adjustment part 17c is larger than a reflection area of the first light adjustment part 17b.

This structure is related to the arrangement between the light adjustment parts of this reflective sheet and light adjustment parts of another reflective sheet, which will be described with reference to FIGS. 14 and 15, and the structure will be described below.

Meanwhile, the vertical length of the second light adjustment part 17c may be equal to or more than half the vertical length of the reflective sheet 17 so as to reflect light emitted from the side of the light guide plate 15 as much as possible.

The reflective sheet 17 shown in FIG. 13 is mounted at one of the light emitting device assemblies disposed at the middle of the bottom cover 110 (see FIG. 1) in the vertical direction. The first light adjustment part 17b of the reflective sheet 17 is provided at the lower part of the side of the reflective sheet 17 so that the first light adjustment part 17b is disposed adjacent to the light emitting device module 13 (see FIG. 11).

The second light adjustment part 17c is disposed above the first light adjustment part 17b with the result that the second light adjustment part 17c is spaced apart from the light emitting device module 13 by a predetermined distance.

Figure 14:
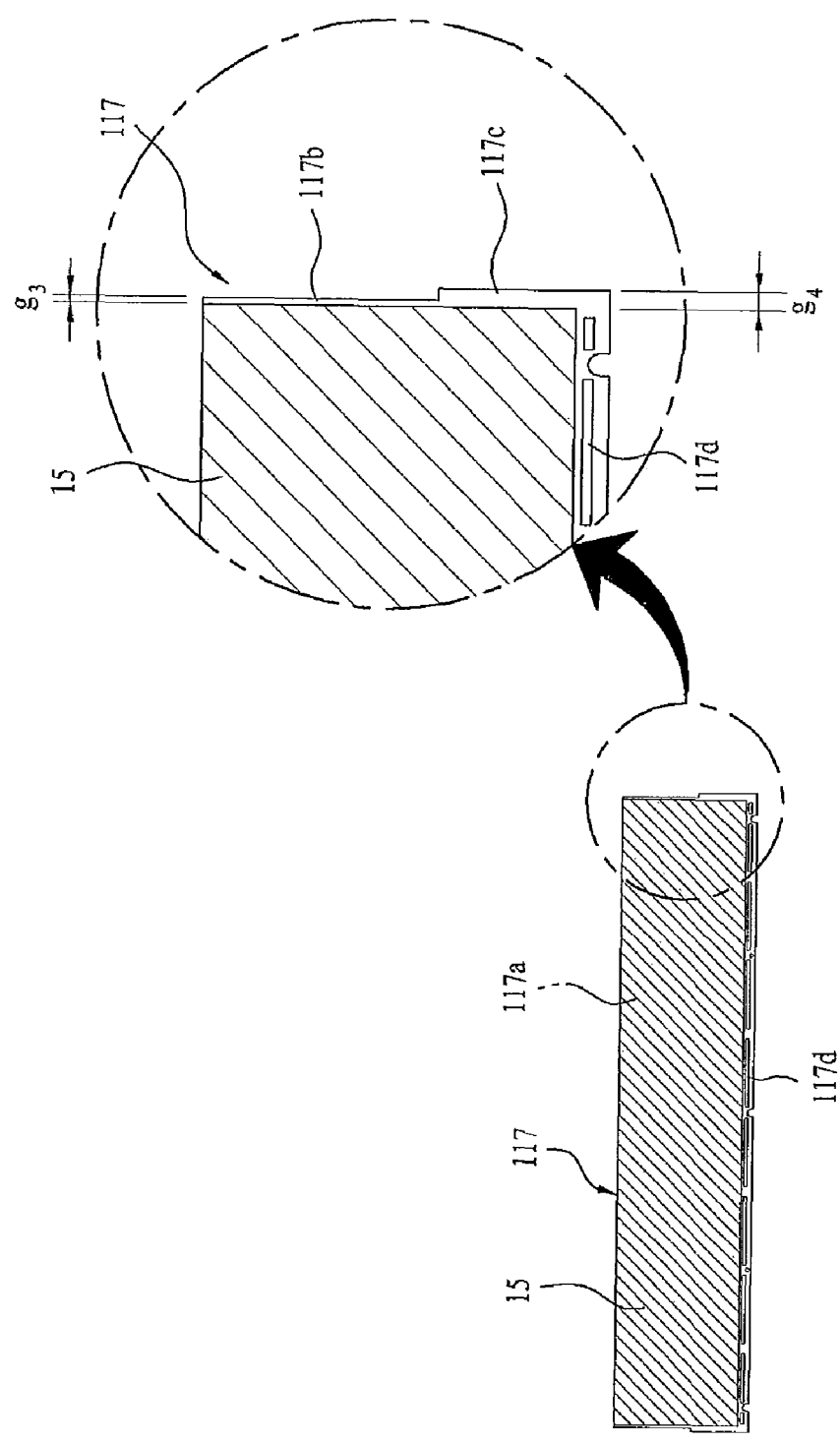
FIG. 14 is a front view illustrating a second reflection sheet according to an embodiment.

FIG. 14 illustrates a reflective sheet 117 disposed adjacent to the side of the reflective sheet 17 shown in FIG. 13.

Hereinafter, the reflective sheet shown in FIG. 13 will be referred to as a first reflective sheet 17, and the reflective sheet shown in FIG. 14 will be referred to as a second reflective sheet 117.

The second reflective sheet 117 has a first light adjustment part 117b and a second light adjustment part 117c, the arrangement of which is directly opposite to the arrangement of the first light adjustment part and the second light adjustment part shown in FIG. 13.

The second reflective sheet 117 has a larger horizontal width than the light guide plate 15, and the second light adjustment part 117c has an extension length $g_4$, which is longer than an extension length $g_3$ of first light adjustment part 117b.

As a result, a reflection area of the second light adjustment part 117c is larger than a reflection area of the first light adjustment part 117b.

The second light adjustment part 117c is disposed adjacent to the light emitting device module 13 (see FIG. 11), and the second light adjustment part 117b is spaced apart from the light emitting device module 13 by a predetermined distance.

That is, in the first reflective sheet 17 shown in FIG. 13, the first light adjustment part 17b is disposed adjacent to the light emitting device module 13. On the other hand, in the second reflective sheet 117 shown in FIG. 14, the second light adjustment part 117c is disposed adjacent to the light emitting device module 13.

Figure 15:
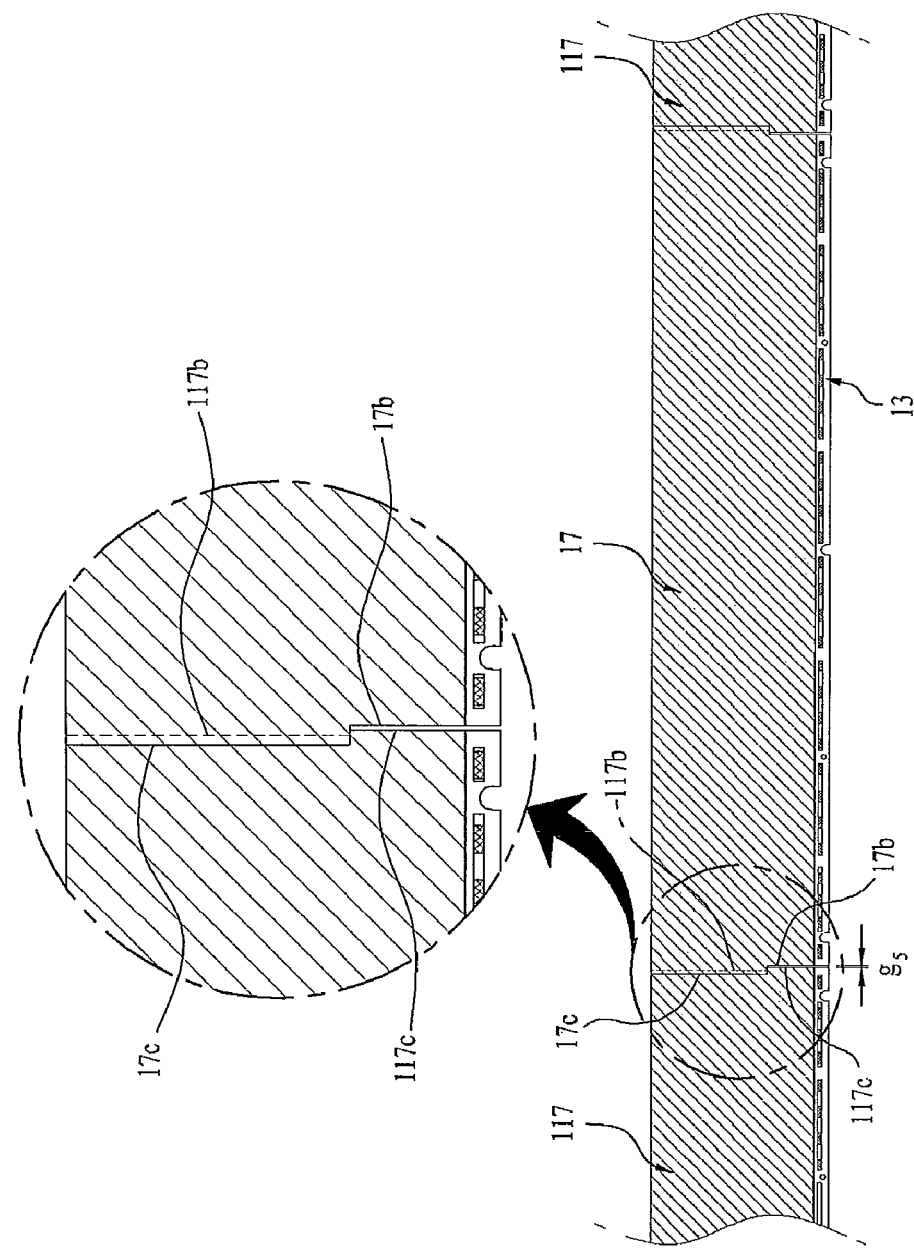
FIG. 15 is a front view illustrating the arrangement of the first reflection sheet and the second reflection sheet according to the embodiments.

When one light emitting device assembly is disposed adjacent to another light emitting device assembly, the reflective sheets of the respective light emitting device assemblies are arranged as shown in FIG. 15.

In particular, when first reflective sheets 17 and second reflective sheets 117 are arranged, two second reflective sheets 117 are disposed at the left and right sides of one first reflective sheet 17.

In this case, the second light adjustment part 17c of each first reflective sheet 17 overlaps or contacts the first light adjustment part 117b of each second reflective sheet 117.

In addition, the first light adjustment part 17b of each first reflective sheet 17 is spaced apart from the second light adjustment part 117c of each second reflective sheet 117 by a predetermined distance.

The above-described arrangement is possible because the extension length $g_1$ of the second light adjustment part 17c of each first reflective sheet 17 is longer than the extension length $g_4$ of the second light adjustment part 117c of each second reflective sheet 117.

When the light emitting device modules 13 (see FIG. 10) are disposed at the first and second reflective sheets 17 and 117, therefore, a space is defined at the portions of the first and second reflective sheets 17 and 117 adjacent to the light emitting device modules 13, i.e., the lower parts of the sides of the first and second reflective sheets 17 and 117.

At the upper parts of the sides of the first and second reflective sheets 17 and 117, the light adjustment parts of the reflective sheets overlap each other.

The reason that some portions of the reflective sheets are separated from each other and the other portions of the reflective sheets overlap each other is that the light emitting device modules 13 are disposed at the lower parts of the reflective sheets 17 and 117, and therefore, an emission amount of light is greater at the lower parts than the upper part of the reflective sheets 17 and 117.

That is, an emission amount of light is large at the lower parts of the reflective sheets 17 and 117, and therefore, an amount of light emitted from the sides of the light guide plates 15 is also large. On the other hand, all light emitted at the lower parts of the reflective sheets 17 and 117 is not transmitted upward but is diffused, and therefore, an amount of light emitted from the sides of the light guide plates 15 is also large at the upper parts of the reflective sheets 17 and 117.

That is, light loss occurs at the upper parts of the reflective sheets 17 and 117 as compared with the lower parts of the upper parts of the reflective sheets 17 and 117. Consequently, light reflected by the overlapping reflective sheets 17 and 117 may compensate the light loss.

Meanwhile, an amount of light emitted from the sides of the light guide plates 15 at the lower parts of the reflective sheets is greater than an amount of light emitted from the sides of the light guide plates 15 at the upper parts of the reflective sheets. Therefore, it is necessary to reduce the amount of light emitted from the sides of the light guide plates 15 at the lower parts of the reflective sheets.

To this end, a space is defined between the adjacent reflective sheets, for example, between the first light adjustment part 17b of the first reflective sheet 17 and the second light adjustment part 117c of the second reflective sheet 117 so that light reflection does not occur in the space.

Therefore, uniform light distribution at the interface between the first reflective sheet 17 and the second reflective sheet 117 is achieved.

Figure 16:
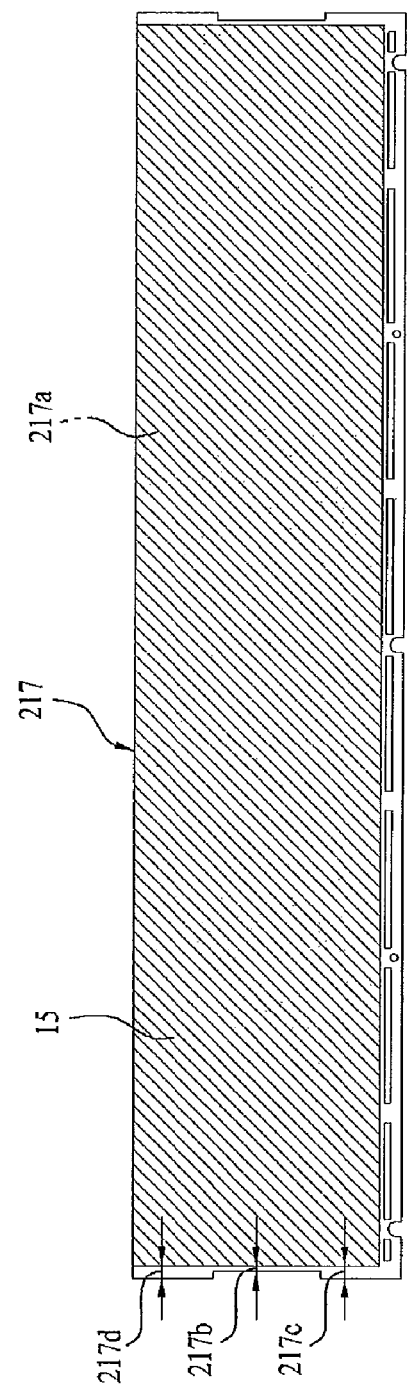
FIG. 16 is a front view illustrating a reflection sheet according to another embodiment.

Referring to FIG. 16, first, second and third light adjustment part 217b, 217c and 217d are provided at each side of a reflective sheet 217.

The first light adjustment part 217b is provided at the middle of each side of the reflective sheet 217. The second light adjustment part 217c is provided below the first light adjustment part 217b. The third light adjustment part 217d is provided above the first light adjustment part 217b.

Here, the second light adjustment part 217c may have a longer extension length than the first light adjustment part 217b, and the third light adjustment part 217d may have a longer extension length than the second light adjustment part 217c.

The light emitting device module 13 is disposed at the lower parts of the reflective sheet 217 and the light guide plate 15. If the intensity of light generated from the light emitting device module 13 is greater than that of light generated from the light emitting device module 13 shown in FIGS. 14 to 16, therefore, light incident upon the light guide plate 15 travels straight to some extent, is diffused and reflected in light guide plate 15, and is emitted to the front or to the side.

Therefore, an amount of light emitted from the side of the light guide plate 15 is the maximum at the middle of the side.

However, since the light emitting device module 13 is disposed at the lower part of the light guide plate 15, an emission amount of light at the lower part of the light guide plate 15 is greater than an emission amount of light at the upper part of the light guide plate 15. That is, an emission amount of light at the middle of the side is the maximum, an emission amount of light at the lower part of the side is medium, and an emission amount of light at the upper part of the side is the minimum.

In order to minimize a reflection amount of light emitted from the middle of the side of the light guide plate 15 and to maximize a reflection amount of light emitted from the upper part of the side of the light guide plate 15, therefore, the length of the third light adjustment part 217d disposed adjacent to the upper part of the side of the light guide plate 15 is maximized so that the reflection area of the third light adjustment part 217d is the maximum, and the length of the first light adjustment part 217b is minimized so that the reflection area of the first light adjustment part 217b is the minimum.

Figure 17:
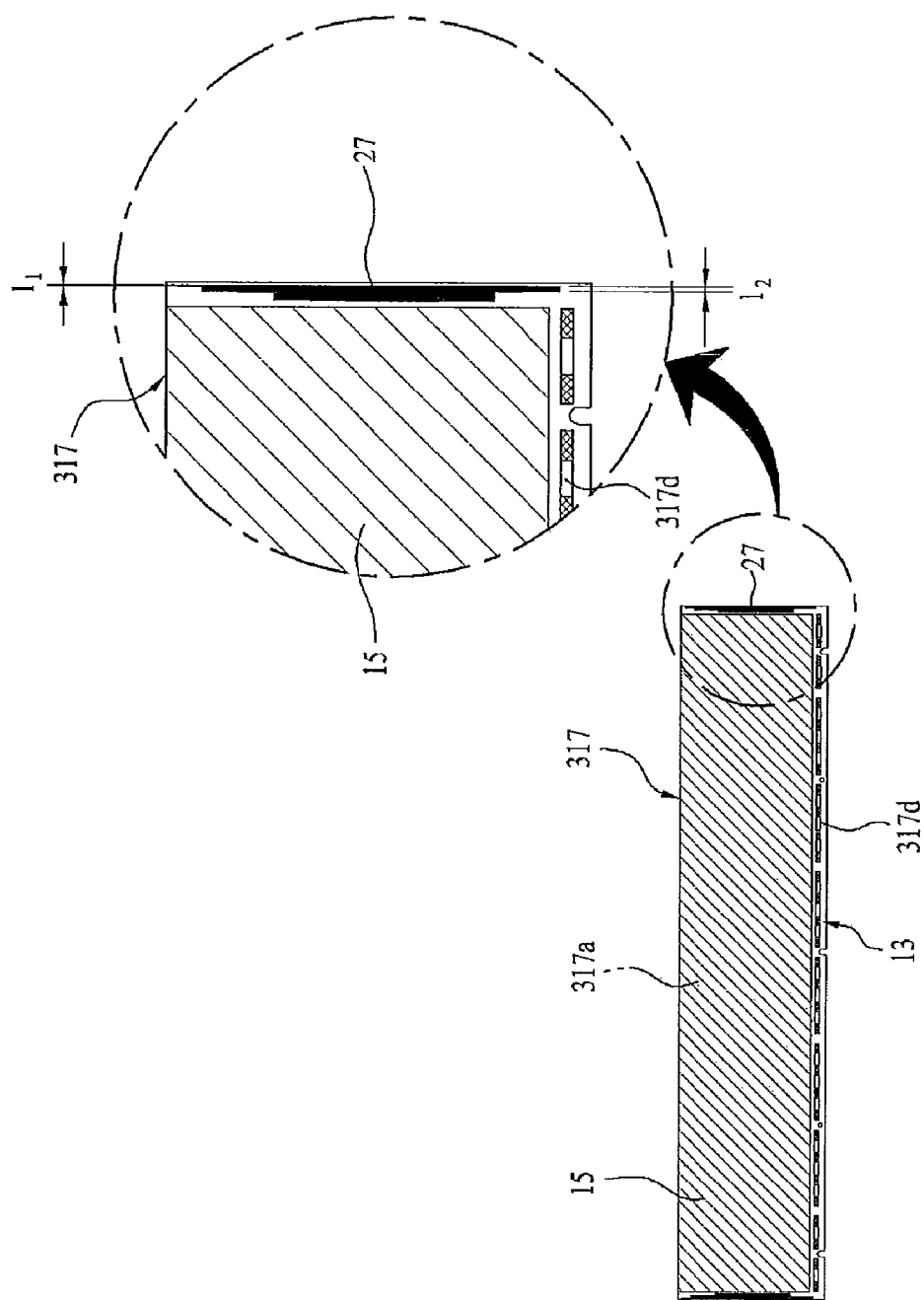
FIG. 17 is a front view illustrating a reflection sheet having a print pattern according to an embodiment.

FIG. 17 illustrates a reflection sheet 317, at each side of which a degree of light reflection is adjustable, according to another embodiment. A print pattern 27 is provided over each side of the reflection sheet 317 so that the print pattern 27 extends in the vertical direction.

The print pattern 27 has a dark color, such as black, blue or indigo, which absorbs light to some extent.

The horizontal width of the reflection sheet 317 is larger than the horizontal width of the light guide plate 15. When the light guide plate 15 overlaps the reflection sheet 317, therefore, each side of the reflection sheet 317 protrudes to some extent.

The print pattern 27 is formed at the protruding portion of each side, and therefore, all or some of the print pattern 27 is not covered by the light guide plate 15.

The print pattern 27 is provided to adjust a reflection amount of light emitted from the side of the light guide plate 15. Consequently, it is necessary for the print pattern 27 not to be covered by the light guide plate 15.

An amount of light emitted from the side of the light guide plate 15 is the maximum at the middle of the side of the light guide plate 15 or portions adjacent to the middle. An amount of light emitted from the side of the light guide plate 15 is gradually reduced toward the upper and lower ends of the light guide plate 15.

Since the light emitting device module 13 is disposed at the lower ends of the reflective sheet 317 and the light guide plate 15, light incident upon the light guide plate 15 from the light emitting device module 13 travels straight to some extent, is diffused and reflected in the light guide plate 15, and is emitted to the front or to the side.

Therefore, an amount of light emitted from the side of the light guide plate 15 is the maximum at the middle of the side.

However, since the light emitting device module 13 is disposed at the lower part of the light guide plate 15, an emission amount of light at the lower part of the light guide plate 15 is greater than an emission amount of light at the upper part of the light guide plate 15. That is, an emission amount of light at the middle of the side is the maximum, an emission amount of light at the lower part of the side is medium, and an emission amount of light at the upper part of the side is the minimum.

In order to minimize a reflection amount of light emitted from the middle of the side of the light guide plate 15 and to maximize a reflection amount of light emitted from the upper part of the side of the light guide plate 15, therefore, the width of the print pattern may be varied depending on positions.

That is, the thickness of the pattern adjacent to the middle of the side of the light guide plate 15 at which an emission amount of light is relatively large is the maximum, and the thickness $l_1$ of the pattern adjacent to the upper part of the side of the light guide plate 15 at which an emission amount of light is relatively small is the maximum.

The thickness $l_1$ of the pattern adjacent to the lower part of the side of the light guide plate 15 may be between the thickness of the pattern at the middle and the thickness $l_1$ of the pattern at the upper part.

Also, the thickness of the pattern may be reduced gradually or in stages from the middle to the upper and lower parts.

Figure 18:
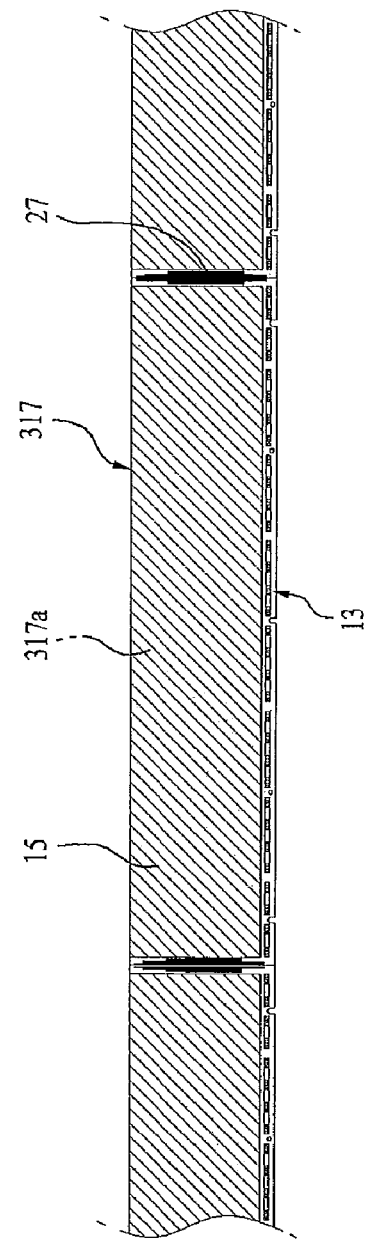
FIG. 18 is a front illustrating the arrangement of a plurality of reflection sheets each having a print pattern according to an embodiment.

Therefore, when reflective sheets 317 are disposed in the horizontal direction as shown in FIG. 18, print patterns 27 are disposed adjacent to each other to adjust an amount of light emitted from the light guide plate 15, thereby achieving uniform light distribution throughout a screen.

In the above-described embodiments, the light emitting device assemblies are independently assembled, thereby conveniently managing the back light unit.

Also, current is independently input to each light emitting device assembly, and current is independently input to the light emitting devices of each light emitting device assembly, thereby achieving local screen brightness control, such as local dimming.

The reflective sheet constituting the light emitting device assembly is provided with the protrusion-shaped light adjust parts or the print patterns which adjust a reflection amount of light, thereby adjusting a reflection amount of light emitted from the side of the light guide plate.

Specifically, a reflection amount of light at the lower part of the middle of each of the light guide plate at which an emission amount of light is relatively large may be adjusted to be less than a reflection amount of light at the upper part of each of the light guide plate at which an emission amount of light is relatively small.

Therefore, the brightness of light at the interfaces between the light emitting device assemblies is uniformalized when viewing a screen from the outside.

As is apparent from the above description, assembly and management of the light emitting device assemblies of the back light unit are more easily achieved, and light is uniformly distributed on a screen.

It will be apparent to those skilled in the art that various modifications and variations can be made in the embodiments without departing from the spirit or scope of the embodiments. Thus, it is intended that the embodiments cover the modifications and variations of this embodiments provided they come within the scope of the appended claims and their equivalents.

What is claimed is:

1. A back light unit comprising a light emitting device assembly, wherein the light emitting device assembly comprises:
    a light emitting device module having a light emitting diode;
    a light guide plate disposed adjacent to the light emitting device module, the light guide plate having a light incidence part upon which light generated from the light emitting diode is incident and a light emission part from which the incident light is emitted;
    a reflective sheet provided at one side of the light guide plate; and
    a light adjustment part extending from the reflective sheet, the light adjustment part adjusting a reflection amount of the light emitted from the light guide plate.

2. The back light unit according to claim 1, wherein the light adjustment part is integrally formed with the reflective sheet.

3. The back light unit according to claim 1, wherein the light adjustment part extends from at least one side of the reflective sheet by a predetermined length.

4. The back light unit according to claim 3,
    wherein at least two light emitting device assemblies are disposed adjacent to each other.

5. The back light unit according to claim 3, wherein
    the light adjustment part comprises a first light adjustment part provided at least one side of the reflective sheet, the first light adjustment part having a predetermined reflection area, and a second light adjustment part connected to the first light adjustment part, the second light adjustment part having a larger reflection area than the first light adjustment part, and
    the first light adjustment part extends from the reflective sheet and the second light adjustment part extends longer than the first light adjustment part.

6. The back light unit according to claim 5, wherein the first light adjustment part and the second light adjustment part form a step.

7. The back light unit according to claim 6, wherein
    the light emitting device assembly comprises at least two light emitting device assemblies,
    a first light emitting device assembly has a first light adjustment part provided at a lower part of a light guide plate thereof and a second light adjustment part provided at an upper part of a light guide plate thereof, and
    a second light emitting device assembly disposed adjacent to the first light emitting device assembly has a first light adjustment part provided at an upper part of a light guide plate thereof and a second light adjustment part provided at a lower part of a light guide plate thereof.

8. The back light unit according to claim 7, further comprising:
    a bottom cover for accommodating the light emitting device assemblies wherein at least one of the light emitting device assemblies includes a light emitting device module having a light emitting diode, wherein
    the first light emitting device assembly is disposed at a middle of the bottom cover,
    the second light emitting device assembly is disposed at the first light emitting device assembly, and
    the first and second light emitting device assemblies disposed in a horizontal direction are arranged so as to form a plurality of rows in a horizontal direction of the bottom cover.

9. The back light unit according to claim 7, wherein the second light adjustment part of the first light emitting device assembly has a longer extension length than the second light adjustment part of the second light emitting device assembly.

10. The back light unit according to claim 7, wherein
    the second light adjustment part of the first light emitting device assembly overlaps or contacts the first light adjustment part of the second light emitting device assembly, and the first light adjustment part of the first light emitting device assembly is spaced apart from the second light adjustment part of the second light emitting device assembly.

11. The back light unit according to claim 5, wherein
the light adjustment part further comprises a third light adjustment part extending longer than the second light adjustment part thus having a larger reflection area than the second light adjustment part,
the first light adjustment part is provided at a middle of at least one side of the reflective sheet,
the second light adjustment part is provided below the first light adjustment part, and
the third light adjustment part is provided above the first light adjustment part.

12. The back light unit according to claim 3, wherein the reflective sheet has a larger horizontal width than the light guide plate so that the light adjustment part reflects light emitted from the light guide plate.

13. A back light unit comprising:
a light emitting device module having a light emitting diode;
a light guide plate having a light incidence part disposed adjacent to the light emitting device module so that light generated from the light emitting diode is incident upon the light incidence part and a light emission part from which the incident light is emitted;
a reflective sheet provided at one side of the light guide plate; and
a print pattern disposed on the reflective sheet for adjusting a reflection amount of the light emitted from the light guide plate.

14. The back light unit according to claim 13, wherein the print pattern has a color, such as black, blue or indigo.

15. The back light unit according to claim 13, wherein the print pattern is formed at least one side of a front surface of the reflective sheet.

16. The back light unit according to claim 13, wherein the print pattern slopes to a vertical length direction of the reflective sheet.

17. The back light unit according to claim 16, wherein the print pattern has a maximum width at a middle thereof and the width of the print pattern is reduced gradually from the middle to opposite ends thereof.

18. The back light unit according to claim 17, wherein the print pattern has a lower end adjacent to the light emitting device module, and the width of the lower end of the print pattern is thicker than the width of an upper end of the print pattern.

19. The back light unit according to claim 13, wherein
the reflective sheet has a larger horizontal width than the light guide plate, and
the print pattern is disposed so that at least a portion of the print pattern is located at open area of the light guide plate when the light guide plate overlaps the reflective sheet.

20. The back light unit according to claim 4, wherein the light emitting device assemblies are disposed so that a light adjustment part of a light emitting device assembly at least partially overlaps or contacts a light adjustment part of another light emitting device assembly.

* * * * *